(No Model.)
W. S. ESSICK.
NOSE PIECE GAGE FOR EYEGLASSES.
No. 572,106.  Patented Dec. 1, 1896.
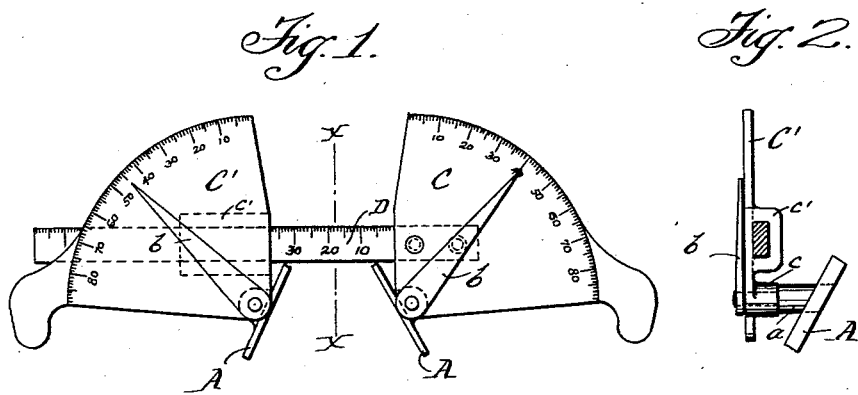
Witnesses.
Wm W Essick
C. A. Cornett
Walter S. Essick
Inventor.
by
Attorney.

UNITED STATES PATENT OFFICE.

WALTER S. ESSICK, OF READING, PENNSYLVANIA.

NOSE-PIECE GAGE FOR EYEGLASSES.

SPECIFICATION forming part of Letters Patent No. 572,106, dated December 1, 1896.

Application filed June 1, 1896. Serial No. 593,714. (No model.)

*To all whom it may concern:*

Be it known that I, WALTER S. ESSICK, a citizen of the United States, residing at Reading, county of Berks, State of Pennsylvania, have invented certain Improvements in Nose-Piece Gages, of which the following is a specification.

My invention relates to a measuring device intended especially to facilitate the fitting of the nose-pieces or guards of eyeglasses or spectacles; and I accomplish this by providing means whereby the oculist is enabled to determine with the greatest ease and accuracy the required spread and angles of the nose-pieces.

The invention is described in connection with the accompanying drawings and is specifically pointed out in the claims.

Figure 1 is a front elevation of a measuring device embodying all the features of my invention as the same appears to the operator when applied to the nose of a patient. Fig. 2 is a sectional view through $x\ x$ of Fig. 1.

A A represent guards or nose-pieces similar or equivalent to those upon the eyeglasses or spectacles to be fitted. These nose-pieces are attached at a suitable angle to shafts $a$, which pass through bosses $c$ on plates C C', in which bosses they rotate freely, so as to assume any angle relative to the line $x\ x$, Fig. 1. These duplicate nose-pieces are maintained in the same plane and at any desired distance apart by means of a bar D, upon which one of the plates C C' is arranged to slide toward the other, the latter being rigidly secured to one end of the bar. These plates C C', as shown, are graduated quadrants, at the center of which are the nose-piece shafts $a\ a$, and the latter are provided on their outer ends with index-fingers $b\ b$, which extend to the graduated periphery of the quadrants.

The operation of the device will be readily understood. When placed upon the nose in the same manner as a pair of eyeglasses, with the nose-pieces A A separated sufficiently by sliding the plate C' upon the bar D, each nose-piece A automatically adjusts itself to the angle of the nose on the particular side against which it bears. The operator then merely records, first, the reading upon the bar D, which gives the required spread of the nose-piece, and, second, the reading of each graduated quadrant or protractor separately, as they frequently differ considerably. When these recorded figures are given to the manufacturer or adjuster, he is enabled, by means of very simple mechanism, to properly adjust the nose-pieces with great ease and accuracy, a result which is of great importance in simplifying and rendering satisfactory this branch of the optical business.

I do not desire to limit myself to the exact construction shown; but

What I claim is—

1. In a nose-piece gage, the combination of a protractor and a nose-piece rotatably mounted at the center thereof and provided with an index-finger arranged approximately at right angles to the nose-piece substantially as set forth.

2. In a nose-piece gage the combination with a slide-bar, of duplicate rotatably-mounted nose-pieces thereon and means for measuring the spread and incline of the nose-pieces substantially as set forth.

3. In a nose-piece gage the combination with a protractor having a nose-piece rotatably mounted at the center thereof and provided with an index-finger, of a measuring-bar fixed to said quadrant, and a duplicate nose-piece sliding on said bar substantially as set forth.

4. In a nose-piece gage the combination with a protractor having a nose-piece rotatably mounted at the center thereof and provided with an index-finger, of a measuring-bar fixed to said quadrant, and a duplicate protractor with centrally-pivoted nose-piece and index, sliding on said bar substantially as set forth.

In testimony whereof I affix my signature in presence of two witnesses.

WALTER S. ESSICK.

Witnesses:
ADAM L. OTTERBEIN,
WM. W. ESSICK.